United States Patent
Wnuck

(10) Patent No.: US 8,948,367 B2
(45) Date of Patent: Feb. 3, 2015

(54) REROUTING OF TRUNKS BY A PBX TO AN ALTERNATE PBX

(75) Inventor: Kenneth Wnuck, Westminster, CO (US)

(73) Assignee: Avaya Inc., Basking Ridge, NJ (US)

(\*) Notice: Subject to any disclaimer, the term of this patent is extended or adjusted under 35 U.S.C. 154(b) by 1324 days.

(21) Appl. No.: 12/193,887

(22) Filed: Aug. 19, 2008

(65) Prior Publication Data

US 2010/0046734 A1    Feb. 25, 2010

(51) Int. Cl.
*H04M 7/00* (2006.01)
*H04M 3/12* (2006.01)

(52) U.S. Cl.
CPC .............. *H04M 7/009* (2013.01); *H04M 3/12* (2013.01)
USPC . 379/229; 379/220.01; 379/258; 379/266.04; 379/279

(58) Field of Classification Search
CPC ... H04M 3/36; H04M 7/0096; H04M 3/2263; H04M 3/2254; H04M 7/009; H04M 2215/7414; H04M 3/08; H04M 3/367; H04M 3/22; H04M 3/42314; H04M 3/42323; H04M 3/5237
USPC .............. 379/211.02, 220.01, 225, 219, 234, 379/232, 233, 231, 198, 1.01–35, 221.03, 379/229, 266.04, 258, 279
See application file for complete search history.

(56) References Cited

U.S. PATENT DOCUMENTS

| | | | |
|---|---|---|---|
| 4,723,273 A | | 2/1988 | Diesel et al. |
| 4,757,267 A | | 7/1988 | Riskin |
| 4,788,720 A | * | 11/1988 | Brennan et al. .......... 379/201.04 |
| 4,878,240 A | | 10/1989 | Lin et al. |
| 4,893,335 A | * | 1/1990 | Fuller et al. .................... 379/200 |
| 4,908,850 A | | 3/1990 | Masson et al. |
| 5,012,511 A | | 4/1991 | Hanle et al. |
| 5,036,535 A | | 7/1991 | Gechter et al. |
| 5,058,105 A | * | 10/1991 | Mansour et al. .............. 370/228 |
| 5,153,907 A | | 10/1992 | Pugh et al. |
| 5,168,515 A | | 12/1992 | Gechter et al. |
| 5,210,789 A | | 5/1993 | Jeffus et al. |
| 5,369,695 A | | 11/1994 | Chakravarti et al. |
| 5,454,025 A | * | 9/1995 | Mulrow et al. ................. 379/45 |
| 5,933,828 A | * | 8/1999 | Eitel et al. ............................ 1/1 |

(Continued)

FOREIGN PATENT DOCUMENTS

CN    1997048 A    7/2007

OTHER PUBLICATIONS

Verizon Business, "Custom Redirect Service", Fact Sheet: Voice Services, 2007, 2 pp.

*Primary Examiner* — Oleg Asanbayev

(57) ABSTRACT

A switching system that receives communications over a trunk incoming from a communications network and routes them to its subtending communications terminals responds to a stimulus, such as actuation of an actuator, by either (a) returning all of the communications that it receives on the incoming trunk at least subsequently to the stimulus to the network over a trunk outgoing to the network with instructions directing the network to redirect the returned communications to a second switching system for routing to communications terminals served by the second system, or (b) routing all of the communications that it receives on the incoming trunk at least subsequently to the stimulus to the second switching system over a trunk outgoing to the second switching system for routing to the communications terminals served by the second switching system.

16 Claims, 2 Drawing Sheets

(56) References Cited

U.S. PATENT DOCUMENTS

| | | | |
|---|---|---|---|
| 6,044,141 A * | 3/2000 | Ho et al. | 379/221.15 |
| 6,067,451 A * | 5/2000 | Campana et al. | 455/412.1 |
| 6,078,659 A * | 6/2000 | De Trana et al. | 379/221.03 |
| 6,366,668 B1 * | 4/2002 | Borst et al. | 379/266.04 |
| 6,763,103 B1 * | 7/2004 | Willrett | 379/229 |
| 6,868,080 B1 * | 3/2005 | Umansky et al. | 370/354 |
| 7,308,499 B2 * | 12/2007 | Chavez | 709/226 |
| 7,542,427 B2 * | 6/2009 | Bollinger et al. | 370/238 |
| 8,548,151 B1 * | 10/2013 | Dianda | 379/219 |

* cited by examiner

REROUTING OF TRUNKS BY A PBX TO AN ALTERNATE PBX

TECHNICAL FIELD

This invention relates to generally telecommunications, and specifically to telecommunications failover arrangements.

BACKGROUND OF THE INVENTION

Multiple telephony switching systems, such as private branch exchanges (PBXs), are often configured such that one or more of them can take over communications processing for another of them. This is generically referred to herein as a "failover" arrangement. Failover arrangements are usually implemented for reliability, that is, to ensure continuity of communications capability should one of the switches fail. Failover arrangements can take many forms, but a common form is the active/standby mode wherein two or more switches are duplicated, at least one of them is active and processing calls, and at least another one of them is standing by ready to take over for the active switch. The duplicated switches may be co-located and therefore can share communications trunks that connect them to the public switched telephone network (PSTN). However, this does not protect the entity—e.g., a business or an agency—served by the switches against loss of communications capability due to the location itself becoming unusable, such as in the case of a disaster. Therefore, the duplicated switches typically are geographically separated (located at different locations) in order to provide continuity of communications capability should one of the locations become unusable. In this case, the duplicated switches can no longer share trunks, and they rely on the PSTN to redirect communications that would normally be directed to one (the formerly-active) location to the other (the formerly-standby) location.

If the active switch fails, the failure is detected and the redirection is effected automatically by the PSTN. But there are situations where the entity served by the switches may wish to have the redirection effected voluntarily even though the active switch has not failed. For example, the entity may wish to have the redirection effected because of an emergency, a practice drill, or building maintenance at the location of the active switch. One way of effecting voluntary redirection is to have the communications administrator of the entity served by the switches re-administer call routing on the active switch in order to force the redirection. But, administration is time consuming, and also complex and hence prone to errors. Therefore, re-administration is not a good solution during emergencies. Another way of effecting voluntary redirection is provided as a service by the PSTN. This service (referred to in the trade as Custom Redirect Service, Switched Redirect Service, or Disaster Routing Service) allows the communications administrator or other representative of the entity served by the PBX switches to contact its service provider in the PSTN and request redirection, which is then effected by the service. CRS is a tariffed service which incurs an additional cost to the entity requesting a redirect service. The CRS service is tariffed on a call-by-call basis, and so the cost can mount up quickly. Another disadvantage is that the served entity has to contact the service provider to obtain the service, which introduces another level of administration.

SUMMARY OF THE INVENTION

A switching system that receives communications over a trunk incoming from a communications network and routes them to its subtending communications terminals responds to a stimulus, such as actuation of an actuator, by either (a) returning all of the communications that it receives on the incoming trunk at least subsequently to the stimulus to the network over a trunk outgoing to the network with instructions directing the network to redirect the returned communications to a second switching system for routing to communications terminals served by the second switching system, or (b) routing all of the communications that it receives on the incoming trunk at least subsequently to the stimulus to the second switching system over a trunk outgoing to the second switching system for routing to the communications terminals served by the second switching system.

The invention may be implemented both as a method and an apparatus, as well as a computer-readable medium containing instructions which, when executed by a computer, cause the computer to perform the method.

DETAILED DESCRIPTION

Figure 1:
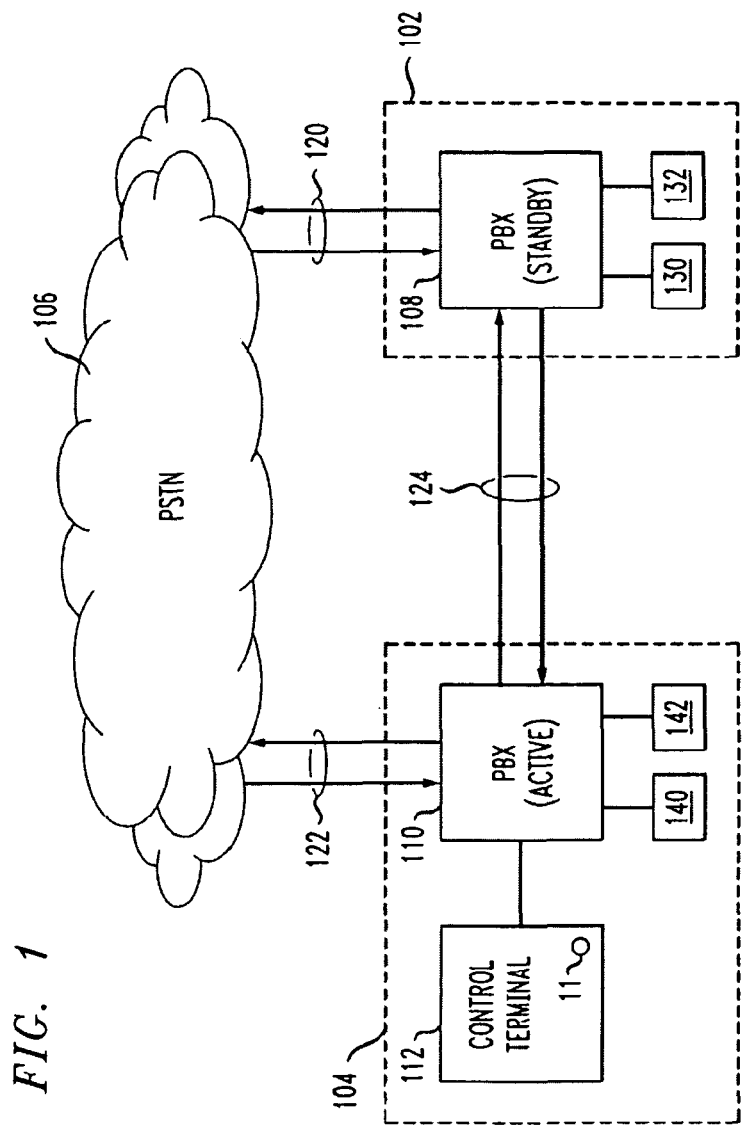
FIG. 1 is a block diagram of a communications system that includes an illustrative embodiment of the invention.

FIG. 1 shows a communications system that has a replicated switch arrangement. In this illustrative example, the replicated arrangement comprises duplicated switches, illustratively PBXs 108, 110, located at different locations 102, 104, respectively, and interconnected by a communications network, illustratively the PSTN 106. One or more groups of incoming and outgoing trunks 120 connect PBX 108 to PSTN 106, and one or more groups of incoming and outgoing trunks 122 connect PBX 110 to PSTN 106. Additionally, PBXs 108 and 110 may be interconnected directly, without intermediacy of PSTN 106, by one or more incoming and outgoing trunks 124. Trunks 124 can be any type of desired transport, such as time-division multiplexed (TDM) trunks or Internet Protocol (IP) network connections. Incoming and outgoing trunks may be the same physical trunks that are divided only logically (i.e., virtually, by function) into incoming and outgoing communications connections. Typically, PBX 108 provides communications services to its subtending communications terminals 130-132, such as telephones, and routes incoming communications to individual ones of terminals 130-132, and PBX 110 provides communications services to its subtending communications terminals 140-142 and routes incoming communications to individual ones of terminals 140-142. One or more terminals 130-132 and 140-142 can optionally be served by both PBXs 108, 110 (not shown). Illustratively, duplicated PBXs 108, 110 operate in an active/standby configuration wherein PBX 110 is normally active and PBX 108 is normally standby. PBXs 108,110 are typically stored-program controlled entities, each comprising a store for storing programs and data and a processor for executing the programs and generating or using the data. PBX 110 is served by a control terminal 112, such as an administrative console or a telephone terminal that is administered with special permissions, via which control can be exerted over the operation of PBX 110. As described so far, the system of FIG. 1 is conventional.

According to one aspect of the invention, control terminal 112 is equipped with a physical or a virtual actuator 114, the actuation of which causes PBX 110 to effect redirection of incoming calls from PBX 110 to PBX 108. Illustratively, actuator 114 may be a physical button or a selectable control displayed on a display screen, while a virtual actuator 114 may be a feature access code. According to an aspect of the invention, PBX 110 returns communications that it receives on incoming trunks 122 to PSTN 106 along with instructions to redirect the communications to trunks 120 of PBX 108. According to another aspect of the invention, PBX 110 itself reroutes communications that it receives on incoming trunks 122 to PBX 108 via trunks 124. Illustratively, actuation of actuator 114 causes PBX 110 to execute either a program 200 whose functionality is shown in FIG. 2 or a program 300 whose functionality is shown in FIG. 3.

Figure 2:
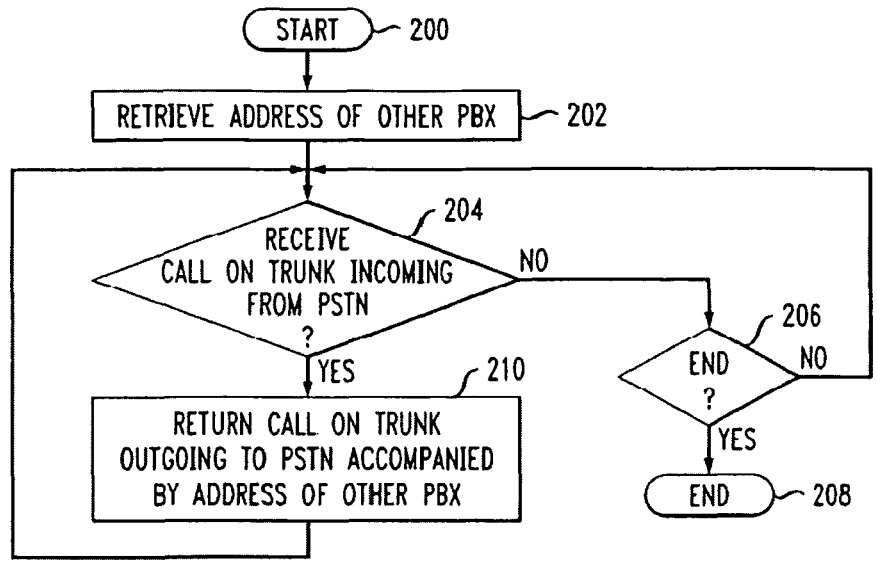
FIG. 2 is a functional flow diagram of operations of a PBX of the system of FIG. 1, according to one aspect of the invention.

In response to actuation of actuator 116, entry of the appropriate FAC on control terminal 112, or some other form of invocation, PBX 110 starts execution of the program of FIG. 2, at step 200. PBX 110 retrieves the address—a numerical prefix, for example—of the other PBX 108 from its administrative data, at step 202. PBX 110 then awaits receipt of an incoming call from PSTN 106 on incoming trunk 122, at step 204. Meanwhile, if ending of program execution is signaled, such as by another actuation of actuator 116, actuation of another actuator, entry of an appropriate FAC, or in some other manner, at step 206, PBX 110 ends execution of the program, at step 208.

Returning to step 204, upon receipt of a call on incoming trunk 122, PBX 110 returns the call back to PSTN 106 by rerouting it to outgoing trunk 122 and accompanies the call with the address of the other PBX 108 as the call's destination, at step 210. Illustratively, PBX 110 prepends the address of PBX 108 to the destination address of the call that it received on incoming trunk 122. PSTN 106 will respond to the address of PBX 108 by routing the returned call to PBX 108, just as if it were a call originating at PBX 110 and destined for PBX 108. The call path thus loops through PBX 110 on its way to PBX 108. Program execution then returns to step 204 to await receipt of another incoming call.

Figure 3:
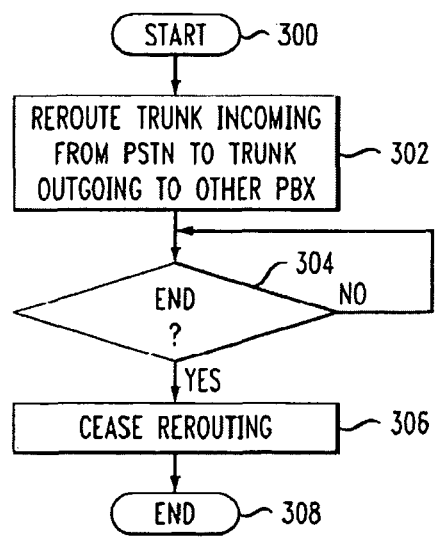
FIG. 3 is a functional flow diagram of operations of the PBX according to another aspect of the invention.

Alternatively in response to an invocation, PBX 110 starts execution of the program of FIG. 3, at step 300. PBX 110 connects an incoming trunk 122 to an outgoing trunk 124, thus rerouting all calls incoming on trunk 122 directly to PBX 108 via trunk 124, at step 302. PBX 110 then awaits receipt of an indication that rerouting is to end, at step 304. Upon receipt of such an indication, PBX 110 ceases rerouting of calls on incoming trunk 122 to outgoing trunk 124, at step 306, and ends execution of the program, at step 308.

Of course, various changes and modifications to the illustrative embodiment described above will be apparent to those skilled in the art. For example, an apparatus may be interposed between the PSTN and the PBX that provides the rerouting function after the PSTN routes the call to the customer premises but before the PBX receives the call. The call would still attempt to terminate to the PBX but would be re-routed by the apparatus before the PBX receives the stimulus. The apparatus is preferably located on the customer premises after the PSTN demarcation point but before the physical PBX termination. These changes and modifications can be made without departing from the spirit and the scope of the invention and without diminishing its attendant advantages. It is therefore intended that such changes and modifications be covered by the following claims except insofar as limited by the prior art.

What is claimed is:

1. A method comprising:
receiving communications from a communications network via an incoming trunk at a first switching system, wherein the first switching system and a second switching system together form a failover arrangement comprising an active/standby configuration of replicated switching systems;
routing a first portion of the communications received by the first switching system prior to a stimulus to communications terminals served by the first switching system;
in response to the stimulus received by the first switching system, the first switching system returning a second portion of the communications received by the first switching system subsequent to the stimulus via an outgoing trunk to the communications network with instructions indicating the first switching system as an origin of the returned communications and directing the communications network to redirect the returned communications to the second switching system for routing of the redirected communications by the second switching system to communications terminals served by the second switching system.

2. The method of claim 1 further comprising:
in response to the instructions, redirecting the returned communications by the communications network to the second switching system;
routing, to communications terminals served by the first switching system, a third portion of the communications received by the first switching system subsequent to termination of the stimulus.

3. The method of claim 2 further comprising:
routing the redirected communications by the second switching system to the communications terminals served by the second switching system.

4. The method of claim 1 wherein:
the stimulus comprises actuation of an actuator.

5. The method of claim 1 wherein:
the stimulus comprises a feature access code.

6. The method of claim 1 wherein:
the instructions comprise associating an address with the second portion of the communications by the first switching system.

7. The method of claim 6 wherein:
the associated address comprises an address of the second switching system.

8. The method of claim 1 wherein:
the instructions comprise prepending a first address by the first switching system to a second address of each of the second portion of the communications.

9. The method of claim 8 wherein:
the first address comprises an address of the second switching system.

10. A method comprising:
receiving communications from a communications network via an incoming trunk at a first switching system, wherein the first switching system and a second switching system together form a failover arrangement comprising an active/standby configuration of replicated switching systems;
routing a first portion of the communications received by the first switching system prior to a stimulus to communications terminals served by the first switching system;
in response to the stimulus received by the first switching system, the first switching system rerouting a second portion of the communications received by the first switching system via the incoming trunk subsequent to the stimulus via an outgoing trunk to the communications network with instructions indicating the first switching system as an origin of the returned communications and directing the communications network to reroute communications to the second switching system for subsequent routing of the rerouted communications by the second switching system to communications terminals served by the second switching system.

11. The method of claim 10 further comprising:

routing the rerouted communications by the second switching system to the communications terminals served by the second switching system;

routing, to communications terminals served by the first switching system, a third portion of the communications received by the first switching system subsequent to termination of the stimulus.

12. The method of claim 10 wherein:

the stimulus comprises actuation of an actuator.

13. The method of claim 10 wherein:

the stimulus comprises a feature access code.

14. The method of claim 10 wherein:

the instructions comprise prepending a first address by the first switching system to a second address of each of the second portion of the communications.

15. At least one non-transitory computer-readable storage medium containing instructions which, when executed by at least one computer, cause the at least one computer to perform the method of one of claims 1-3 and 4-9.

16. At least one non-transitory computer-readable storage medium containing instructions which, when executed by at least one computer, cause the at least one computer to perform the method of one of claims 10, 11 and 12-14.

\* \* \* \* \*